United States Patent
Ikedo

(10) Patent No.: US 9,191,595 B2
(45) Date of Patent: Nov. 17, 2015

(54) IMAGE PROCESSING APPARATUS, IMAGE PROCESSING METHOD AND PROGRAM, AND IMAGE PICKUP APPARATUS INCLUDING IMAGE PROCESSING APPARATUS

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/238,246

(22) PCT Filed: Nov. 16, 2012

(86) PCT No.: PCT/JP2012/080411
§ 371 (c)(1),
(2) Date: Feb. 11, 2014

(87) PCT Pub. No.: WO2013/080899
PCT Pub. Date: Jun. 6, 2013

(65) Prior Publication Data
US 2014/0192237 A1    Jul. 10, 2014

(30) Foreign Application Priority Data
Nov. 30, 2011 (JP) .................................. 2011-262007

(51) Int. Cl.
*H04N 5/367* (2011.01)
*H04N 5/225* (2006.01)
*H04N 5/232* (2006.01)

(52) U.S. Cl.
CPC ............. *H04N 5/367* (2013.01); *H04N 5/2258* (2013.01); *H04N 5/23212* (2013.01); *H04N 5/23229* (2013.01)

(58) Field of Classification Search
CPC .............. H04N 5/367; H04N 5/23212; H04N 5/23229; H04N 5/2258; H04N 7/0157; H04N 5/3656; H04N 13/0282
USPC ........... 348/135, 222.1, 223.1, 289, 290, 291, 348/307, 335, 340, 343, 345
See application file for complete search history.

(56) References Cited

U.S. PATENT DOCUMENTS

| 6,737,625 B2 | 5/2004 | Baharav et al. |
| 7,522,200 B2 | 4/2009 | Dong |

(Continued)

FOREIGN PATENT DOCUMENTS

| EP | 0917358 A1 | 5/1999 |
| JP | 2002-359783 A | 12/2002 |

(Continued)

OTHER PUBLICATIONS

International Search Report and Written Opinion of the ISR issued in corresponding application No. PCT/JP2012/080411 mailed Jan. 8, 2013.

(Continued)

*Primary Examiner* — Hung Lam
(74) *Attorney, Agent, or Firm* — Carter, DeLuca, Farrell & Schmidt, LLP

(57) ABSTRACT

The image processing apparatus processes an image signal obtained from an image pickup element using an image pickup optical system arranged to obtain directional traveling information of object image light corresponding to a pupil division area of a photographing lens. The apparatus includes: a unit of setting a focal position at which the refocused image is generated; and a unit of correcting an image signal of a defect pixel of the image pickup element using an image signal of other pixel. The apparatus determines the other pixel to be used for correcting the image signal of the defect pixel on the basis of the set focal position and the directional traveling information of the object image light.

9 Claims, 13 Drawing Sheets

(56) References Cited

U.S. PATENT DOCUMENTS

| | | | |
|---|---|---|---|
| 7,733,392 B2 | 6/2010 | Mouli | |
| 7,792,423 B2 * | 9/2010 | Raskar et al. | 396/268 |
| 8,106,994 B2 * | 1/2012 | Ichimura | 348/340 |
| 8,928,969 B2 * | 1/2015 | Alpaslan et al. | 359/298 |
| 2008/0266655 A1 * | 10/2008 | Levoy et al. | 359/368 |
| 2010/0085468 A1 * | 4/2010 | Park et al. | 348/345 |
| 2012/0249550 A1 * | 10/2012 | Akeley et al. | 345/419 |

FOREIGN PATENT DOCUMENTS

| | | |
|---|---|---|
| JP | 2008-118570 A | 5/2008 |
| JP | 2008-515110 A | 5/2008 |
| JP | 2010-57067 A | 3/2010 |
| JP | 2010-252105 A | 11/2010 |
| RU | 2412554 C1 | 2/2011 |
| WO | 2007/036055 A1 | 4/2007 |

OTHER PUBLICATIONS

Ren. Ng, et al., "Light Field Photography with a Hand-Held Plenoptic Camera", Stanford Tech Report CTSR, pp. 1-11 (Feb. 2005).

Notice of Allowance issued in corresponding Russian application No. 2014126378 on Jun. 29, 2015.

* cited by examiner

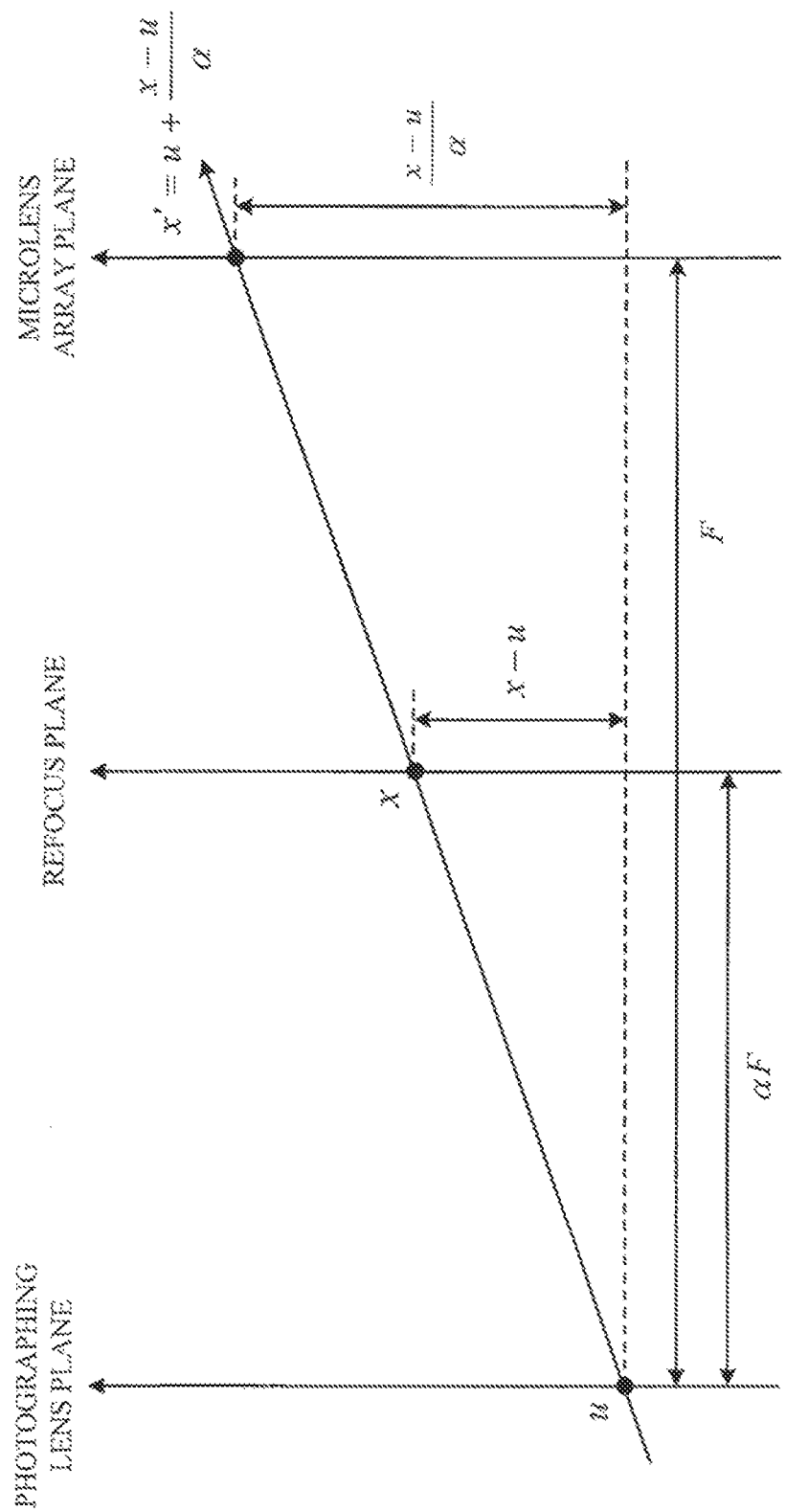

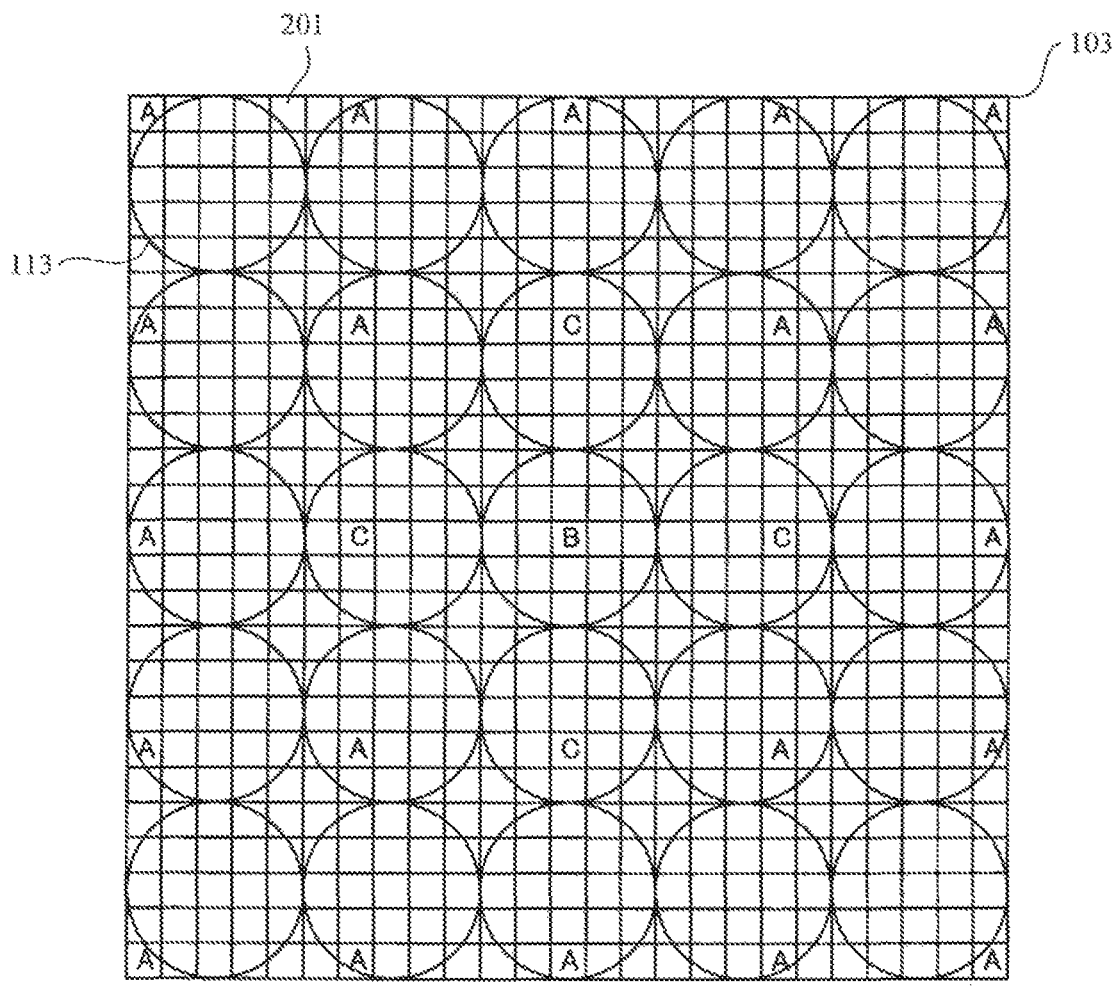

IMAGE PROCESSING APPARATUS, IMAGE PROCESSING METHOD AND PROGRAM, AND IMAGE PICKUP APPARATUS INCLUDING IMAGE PROCESSING APPARATUS

CROSS REFERENCE TO RELATED APPLICATIONS

This application is a U.S. National Stage Patent Application of International Application No. PCT/JP2012/080411, filed Nov. 16, 2012, which claims priority from Japanese Patent Application No. 2011-262007 filed Nov. 30, 2011, the disclosures of each of which are hereby incorporated by reference herein in their entirety.

TECHNICAL FIELD

The present invention relates to an image processing apparatus adopted in an image pickup apparatus using an image pickup element having a microlens array, and particularly to an image processing apparatus for performing correction measures of defect pixels and an image pickup apparatus including the same.

BACKGROUND ART

In recent years, cameras have been proposed that can reconstruct an image at any focal position designated by users from an imaged data obtained so as to include directional traveling information of light in addition to a light intensity distribution. For instance, NPL 1 proposes a light field camera realizing the above-described function using a method called "light field photography". NPL 1 adopts an optical system having a configuration where a microlens array is arranged between a photographing lens and an image pickup element to allow light having passed through different pupil areas of the photographing lens to be converged on respective microlenses. A pixel block including a plurality of pixels is assigned to one microlens. Light converged by the microlens is photoelectrically converted by different pixels included in a corresponding block depending on an incoming direction. An image signal corresponding to a ray of light focused on a synthetic image plane (a refocus plane) and arriving at each microlens is extracted from a thus obtained image signal, thereby allowing an image at any focal position to be reconstructed.

In solid-state image pickup elements, such as a CCD image sensor and CMOS image sensor, a defect pixel may be caused by a crystal defect locally existing in the semiconductor substrate. No correct photoelectric conversion output can be obtained from such a defect pixel. Accordingly, the image pickup signal from the defect pixel is required to be corrected.

Conventional methods for correcting an image pickup signal from a defect pixel are, for example, a method of replacing the pixel value of the defect pixel with the pixel value of a pixel adjacent to the defect pixel, and a method of replacing the pixel value of the detect pixel with the average value of pixels adjacent to the defect pixel.

CITATION LIST

Non Patent Literature

NPL1: Ren. Hg, and seven others, "Light Field Photography with a Hand-Held Plenoptic Camera", Stanford Tech Report CTSR 2005-02

SUMMARY OF INVENTION

Technical Problem

In a light field camera as described in NPL 1, rays of light focused on a refocus plane are received respectively by a plurality of pixels. The farther the position of the refocus plane is distant from the microlens array, the farther the position at which the rays of light are received by respective pixels are separate from each other.

Thus, there is a problem in that the conventional method of correcting the pixel value of a defect pixel using pixel values of adjacent pixels on the photoelectric conversion element cannot appropriately correct the pixel value of the defect pixel.

Solution to Problem

The present invention has been made in consideration of the above-described situation, and provides an image processing apparatus capable of always performing an appropriate correction process concerning a defect pixel, on an image pickup signal obtained so as to include directional traveling information of light.

According to the present invention, an image processing apparatus for processing an image signal obtained from an image pickup element using an image pickup optical system arranged to obtain directional traveling information of object image light corresponding to a pupil division area of a photographing lens includes: a synthetic image plane position setting unit setting a position of a synthetic image plane on which an image of the object is reconstructed using the image signal obtained from the image pickup element; and a correction unit correcting an image signal of a defect pixel, of the image pickup element using an image signal of other pixel of the image pickup element, wherein the correction unit determines the other pixel to be used for correcting the image signal of the defect pixel on the basis of a position of the synthetic image plane set by the synthetic image plane position setting unit, and directional, traveling information of the object image light.

Advantageous Effects of Invention

The present invention can perform appropriate defect pixel correction on a picked-up image for generating a refocused image.

Further features of the present invention will become apparent from the following description of exemplary embodiments with reference to the attached drawings.

BRIEF DESCRIPTION OF DRAWINGS

FIG. 5 is a diagram illustrating a positional relationship between a ray of light passing through a certain pixel on a refocus plane, the pupil division area of the photographing lens and the microlens.

FIGS. 10A and 10B are diagrams illustrating examples of a defect pixel and pixels selected as pixels for correction therefor.

DESCRIPTION OF EMBODIMENTS

Preferred embodiments of the present invention will be described in detail in accordance with the accompanying drawings.

Example 1

Figure 1:
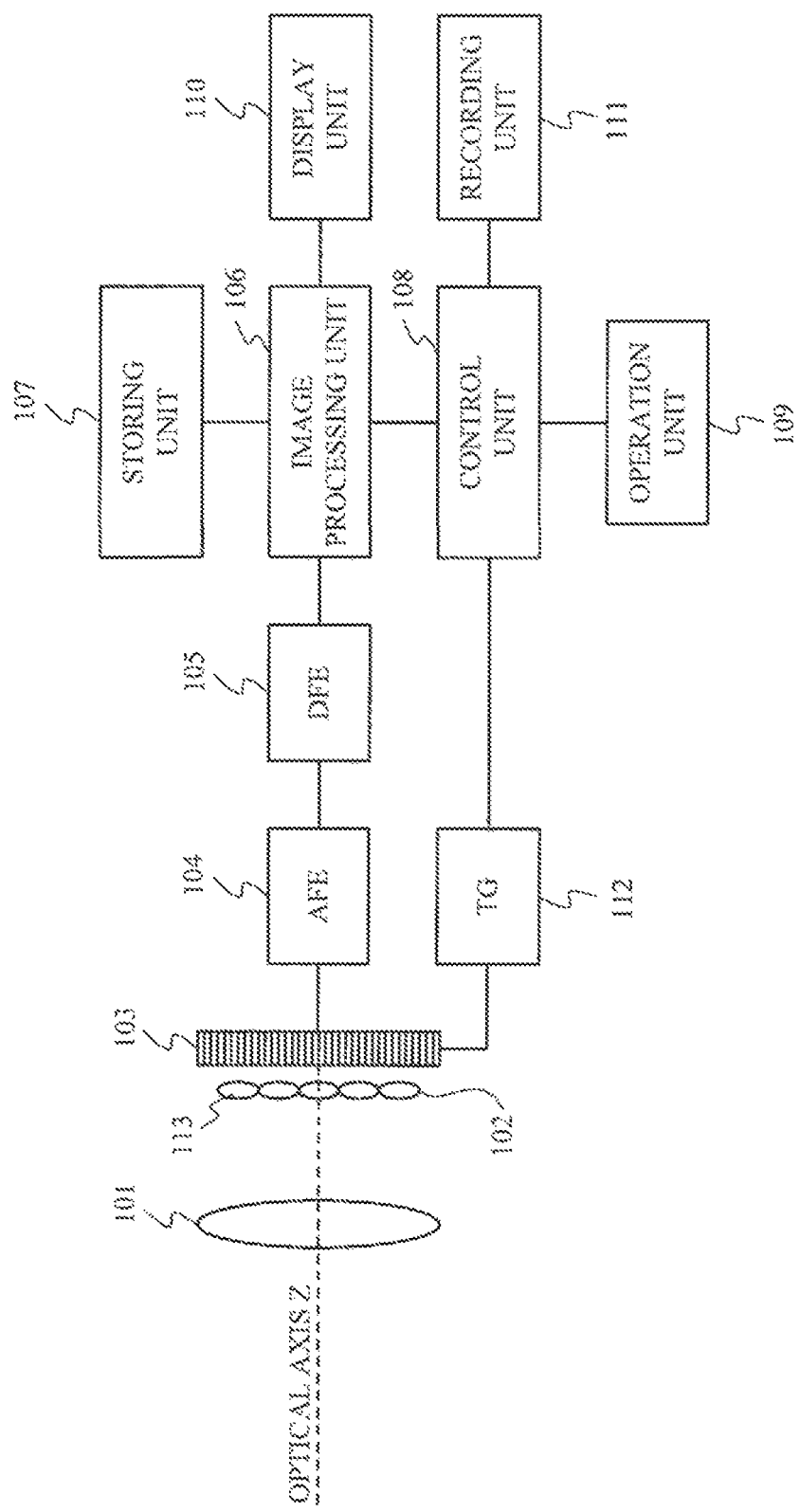
FIG. 1 is a block diagram of the entire image pickup apparatus according to an embodiment of the present invention.

FIG. 1 is a block diagram of an entire image pickup apparatus of a first embodiment of the present invention. In this diagram, object image light having passed through a photographing lens 101 forms an image adjacent to the focal position of the photographing lens 101. A microlens array 102 includes a plurality of microlenses 113. An image pickup optical system includes the microlens array 102 and a photographing lens. The microlens array 102 is arranged adjacent to the focal position of the photographing lens 101. Light passing through a different pupil area of the photographing lens 101 arrives at the microlens array 102 to exit therefrom separately for every pupil division area. The light separated by the microlens array 102 arrives at an image pickup element 103. The image pickup element 103 is constructed with, for instance, any of a CCD image sensor and a CMOS image sensor, and is arranged around the focal position of the microlens array 102.

An analog front end (AFE) 104 performs a reference level adjustment (clamp processing) and an analog-to-digital conversion process on an image signal from the image pickup element 103. A digital front end (DFE) 105 performs a digital correction process, such as a fine shift of the reference level, on a digital image signal output from the AFE 104. An image processing unit 106 applies a prescribed image process to a digital image signal from the DFE 105 and generates and outputs an image data. A storing unit 107 includes a nonvolatile memory for holding defect pixel information (coordinates). A control unit 108 controls the entire image pickup apparatus in a centralized manner, includes a well-known CPU, and loads and executes a program stored in memory, not illustrated, thereby controlling operations of respective components and various processes. An operation unit 109 has a configuration of electrically receiving an operation of an operation member in a digital camera. A user can set any refocus (synthetic image) plane position for generating a refocused image, using the operation unit 109 (synthetic image plane position setting unit). The position of this refocus plane may be automatically set by the control unit 108 using camera barometers.

A display unit 110 displays an image. A recording medium 111 may be any of a memory card and a hard disk. A timing generation circuit (TG) 112 generates various timing signals for driving the image pickup element 103.

Figure 6:
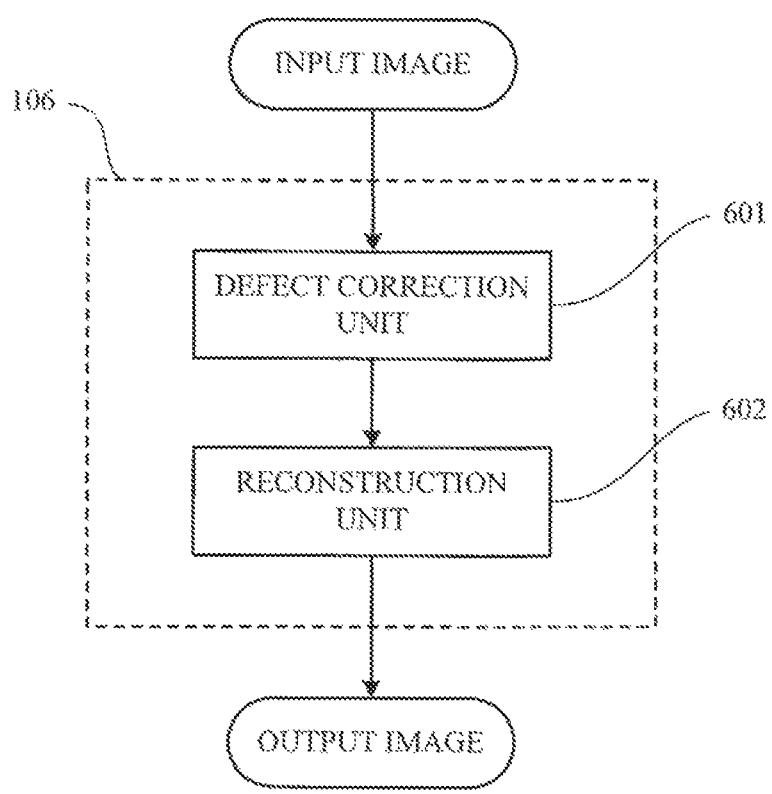
FIG. 6 is a block diagram of an image processing unit of the image pickup apparatus according to the embodiment of the present invention.

As illustrated in FIG. 6, the image processing unit 106 of this embodiment includes a defect correction unit 601 and a reconstruction unit 602. The defect correction unit 601 performs a correction process on a defect pixel of an imaged data. The present invention is characterized by the defect correction unit. The details will be described later. The reconstruction unit 602 in FIG. 6 performs an operation process using a method called "light field photography", thereby reconstructing an image at the set focal position (refocus plane) from the imaged data. The details of the reconstruction unit 602 will be described later.

Next, the configurations of the photographing lens 101, the microlens array 102 and the image pickup element 103 included in the image pickup apparatus of this embodiment will be described.

Figure 2:
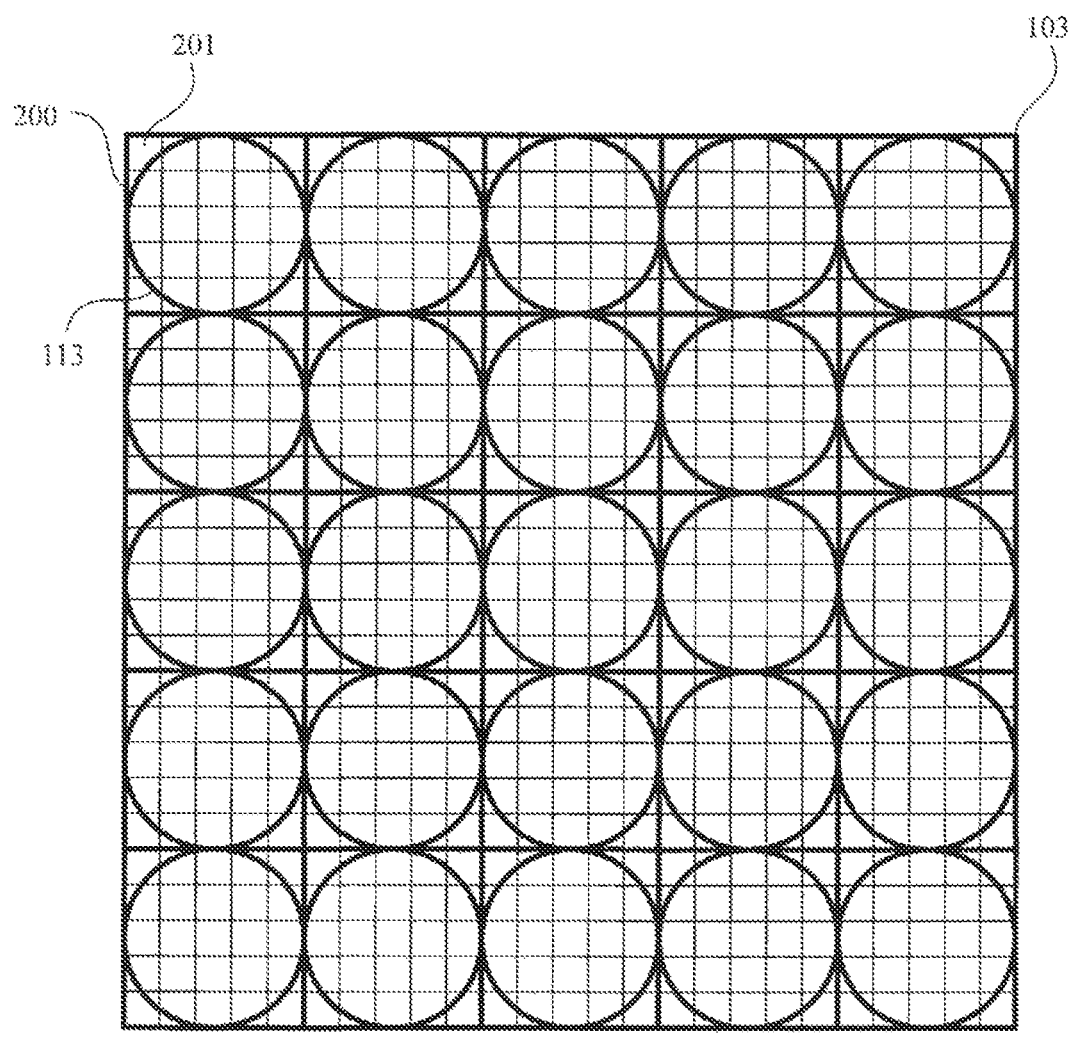
FIG. 2 is a conceptual diagram of the configurations of a pixel array and a microlens array of an image pickup element according so the embodiment of the present invention.

FIG. 2 is a conceptual diagram for describing the configurations of the image pickup element 103 and the microlens array 102. This diagram is a conceptual diagram illustrating arrangement relationship between the image pickup element 103 and the microlens array 102 when observing from a direction of an optical axis Z in FIG. 1. One microlens 113 is arranged in a manner corresponding to a plurality of pixels 201 (hereinafter simply called pixels). The pixels 201 behind one microlens are integrally defined as a pixel array 200 in this embodiment, the pixel array 200 includes 25 pixels 201 in five rows and five columns.

Figure 3:
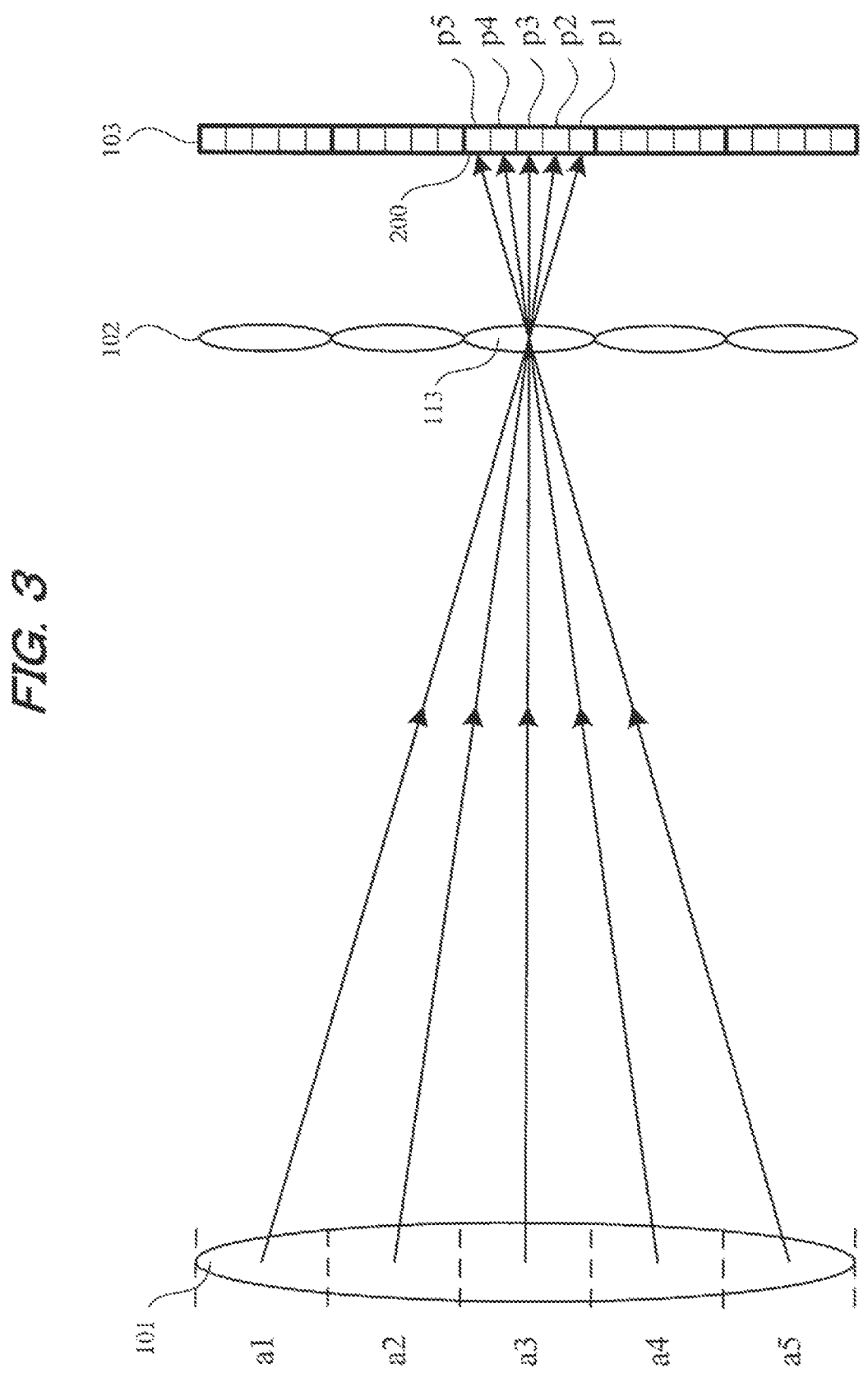
FIG. 3 is a conceptual diagram of the configurations of the photographing lens, the microlens array and the pixel array according to the embodiment of the present invention.

FIG. 3 is a conceptual diagram of a situation where a ray of light emitted from the photographing lens 101 passes through one microlens 113 and is received by the image pickup element 103 when observing from a direction perpendicular to the optical axis Z. Object image light emitted from each of pupil areas a1 to a5 of the photographing lens passes through the microlens 113, and is focused on the photosensitive surfaces of respective pixels p1 to p5 arranged behind the microlens 113. That is, the rays of light exiting from the different pupil division area p1 to p5 pass through one microlens 113 and are photoelectrically converted by different pixels, thereby obtaining directional traveling information of object image light.

Figure 4A:
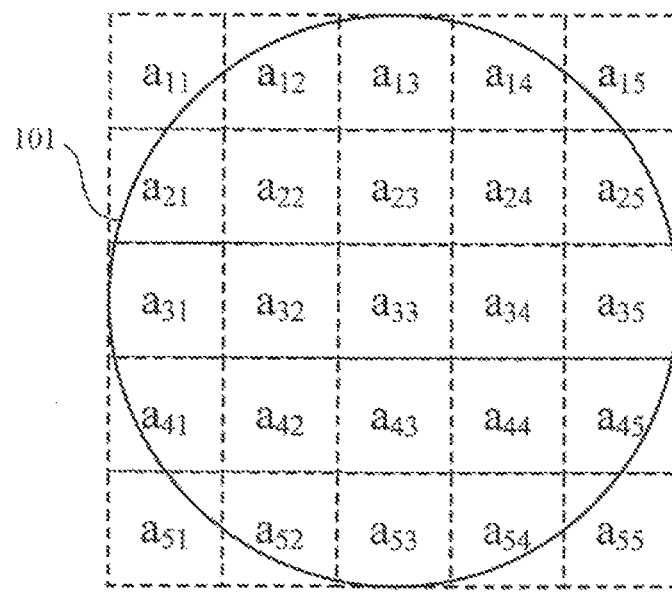
FIGS. 4A and 4B are diagrams illustrating a correspondence relationship between pupil division areas of a photographing lens, microlenses and the pixel array.
Figure 4B:
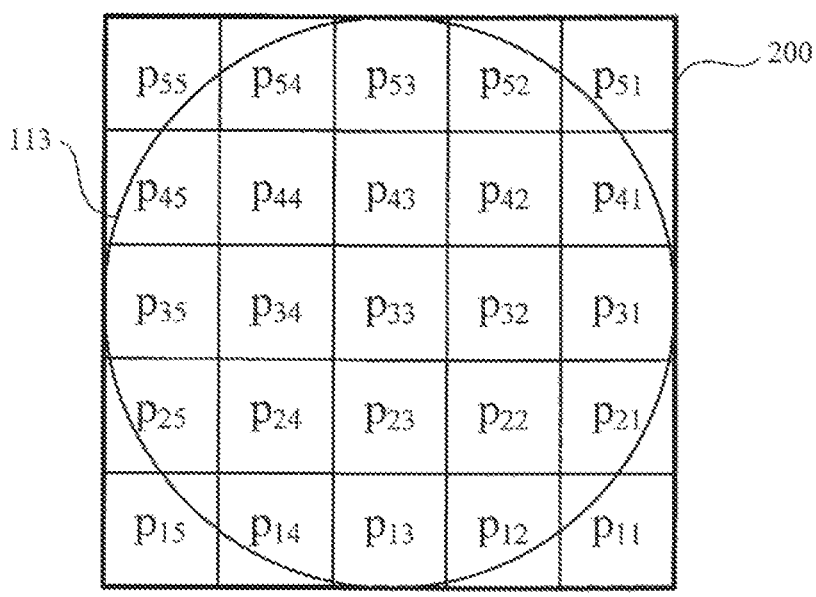

FIG. 4A is a conceptual diagram of the aperture of the photographing lens when viewing from the direction of the optical axis Z. FIG. 4B is a conceptual diagram of one microlens 113 and the pixel array 200 arranged behind the microlens 113 when observing from the direction of the optical axis 1. As illustrated in FIG. 4A, when the pupil area of the photographing lens 101 is divided into regions as many as the pixels included in a pixel array under one microlens, light from one pupil division area of the photographing lens is focused on one pixel. Here, it is assumed that the F-numbers of the photographing lens 101 and the microlens 113 are substantially coincide with each other.

The correspondence relationship between the pupil division areas a11 to a55 of the photographing lens 101 illustrated in FIG. 4A and the pixels p11 to p55 illustrated in FIG. 4B is of point symmetry when viewing from the direction of the optical axis 1. Accordingly, light emitted from the pupil division area a11 of the photographing lens 101 is focused on the pixel p11 included in the pixel array 200 behind the microlens 113. Likewise, light emitted from the pupil division area a11 and passing through another microlens 113 is also focused on the pixel p11 in the pixel array 200 behind that microlens.

Next, a reconstruction process will be described. This process is performed on an image on an arbitrarily-set synthetic image plane (refocus plane) in an image pickup signal obtained by the image pickup system including the photographing lens 101, the microlens array 102 and the image pickup element 103. The reconstruction process is performed under control by the control unit 108 on the basis of a control program in the reconstruction unit 602 illustrated in FIG. 6 using the method called "light field photography".

FIG. 5 is a conceptual diagram illustrating from which pupil division area of the photographing lens 101 a ray of light having passed through a pixel on an arbitrarily-set refocus plane exits and at which microlens 113 the ray arrives, when observing from the direction perpendicular to the optical axis Z. This diagram assumes that the coordinates of the position of the pupil division area on the photographing lens plane are (u, v), the coordinates of the position of the pixel on the refocus plane are (x, y), and the coordinates of the position of the microlens on the microlens array plane are (x', y'). This diagram also assumes that the distance from the photographing lens plane to the microlens array plane is F, and the distance from the photographing lens plane to the refocus plane is αF. A refocus coefficient α is for determining the position of the refocus plane, and can be arbitrarily set by the user (α≠0). FIG. 5 only illustrates the directions u, x and x', but the directions v, y and y' perpendicular thereto are omitted. As illustrated in FIG. 5, the ray of light having passed through the coordinates (u, v) and the coordinates (x, y) reaches the coordinates (x', y') on the microlens array. The coordinates (x', y') can be represented, as an equation (1).

$$(x', y') = \left(u + \frac{x-u}{\alpha}, v + \frac{y-v}{\alpha}\right) \quad (1)$$

Provided that the output of the pixel receiving the ray of light is L (x', y', u, v), an output E(x, y) obtained on the coordinates (x, y) on the refocus plane is an integration of L (x', y', u, v) with respect to the pupil area of the photographing lens. Accordingly, the output is represented as an equation (2).

$$E(x, y) = \frac{1}{\alpha^2 F^2} \int \int L\left(u + \frac{x-u}{\alpha}, v + \frac{y-v}{\alpha}, u, v\right) du dv \quad (2)$$

In the equation (1), the refocus coefficient α is determined by a user. Accordingly, providing (x, y) and (u, v) determines the position (x', y') of the microlens onto which the ray of light is incident. Then, the pixel corresponding to the position (u, v) can be known from the pixel array 200 corresponding to the microlens. The output of the pixel is L (x', y', u, v). The output is obtained on all the pupil division areas. The obtained pixel output is totalized (integrated) according to the equation (2), thereby calculating E(x, y).

Provided that the (u, v) are the representative coordinates on the pupil division areas of the photographing lens (discrete value), the integration of the equation (2) can be calculated by a simple addition (Σ).

As described above, the operation process of the equation (2) is performed, thereby allowing an image on an arbitrary focal position to be reconstructed.

Next, a defect correction operation in the defect correction unit 601, which characterizes the present invention, will be described. This operation is executed under control by the control unit 108 according to a program stored in the system.

Figure 7:
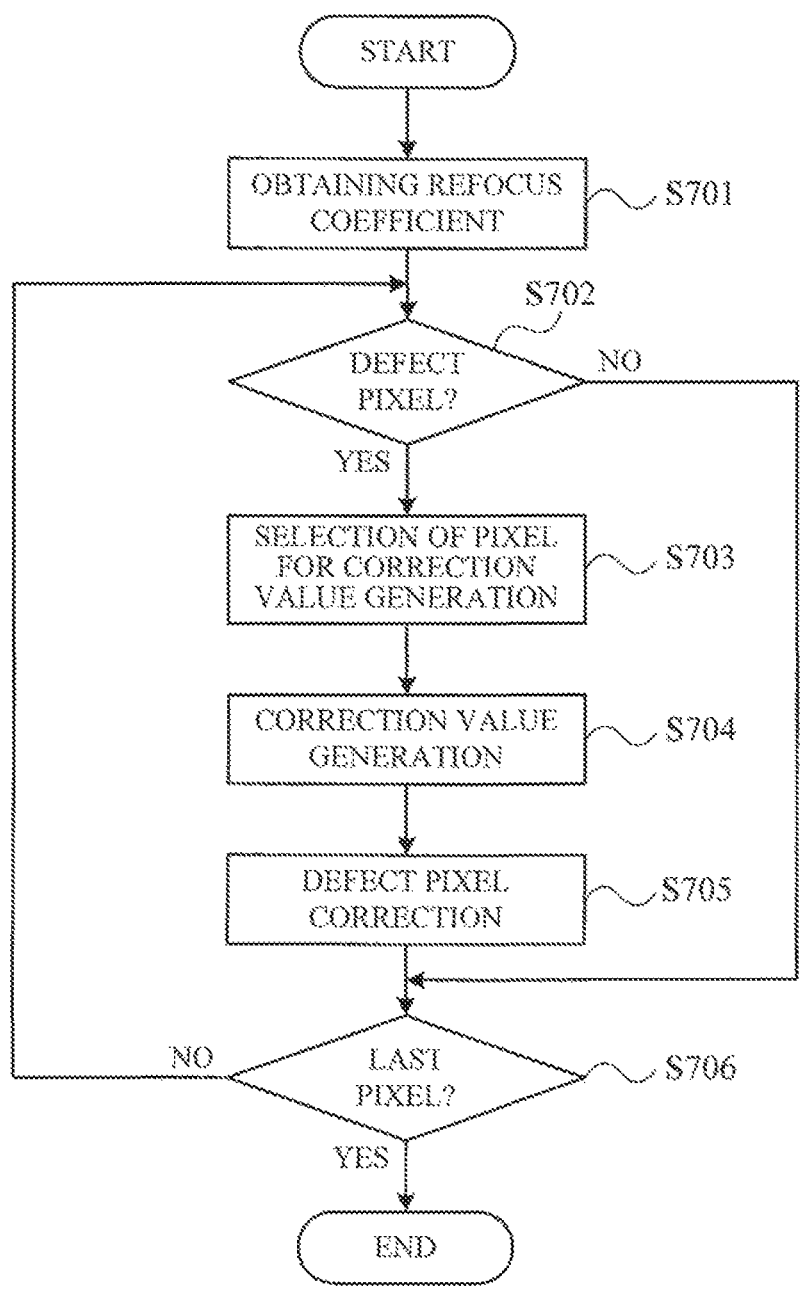
FIG. 7 is a flowchart of a defect correction operation according to the embodiment of the present invention.

FIG. 7 is a flowchart of the defect correction operation in the defect correction unit 601. While determining whether a pixel is a defect pixel or not as to the image signal obtained from each pixel of the image pickup element 103, the defect correction unit 601 corrects the image signal when the pixel is a defect pixel. It is assumed that it has been determined whether the image signal input into the defect correction unit 601 is an image signal from a defect pixel or an image signal from a normal pixel, on the basis of coordinate information of the defect pixel preliminarily stored in the memory in advance, for example.

In step S701, the refocus coefficient α is obtained on the basis of the position of the synthetic image plane set via the operation unit 109.

In step S702, it is determined whether the pixel in the input imaged data is a defect pixel or a normal pixel. If the pixel is the defect pixel, the processing proceeds to step S703. If the pixel is the normal pixel, the processing proceeds to step S706.

In step S703, the pixel used for generating a correction value is selected to create the correction value of the pixel determined as the defect pixel. First, coordinates on the refocus plane of an image to be reconstructed by using the defect pixel. The coordinates of other pixels used for reconstructing the image on the obtained coordinates on the refocus plane are calculated. The pixels used for generating the correction value are selected from among the pixels.

Figure 11:
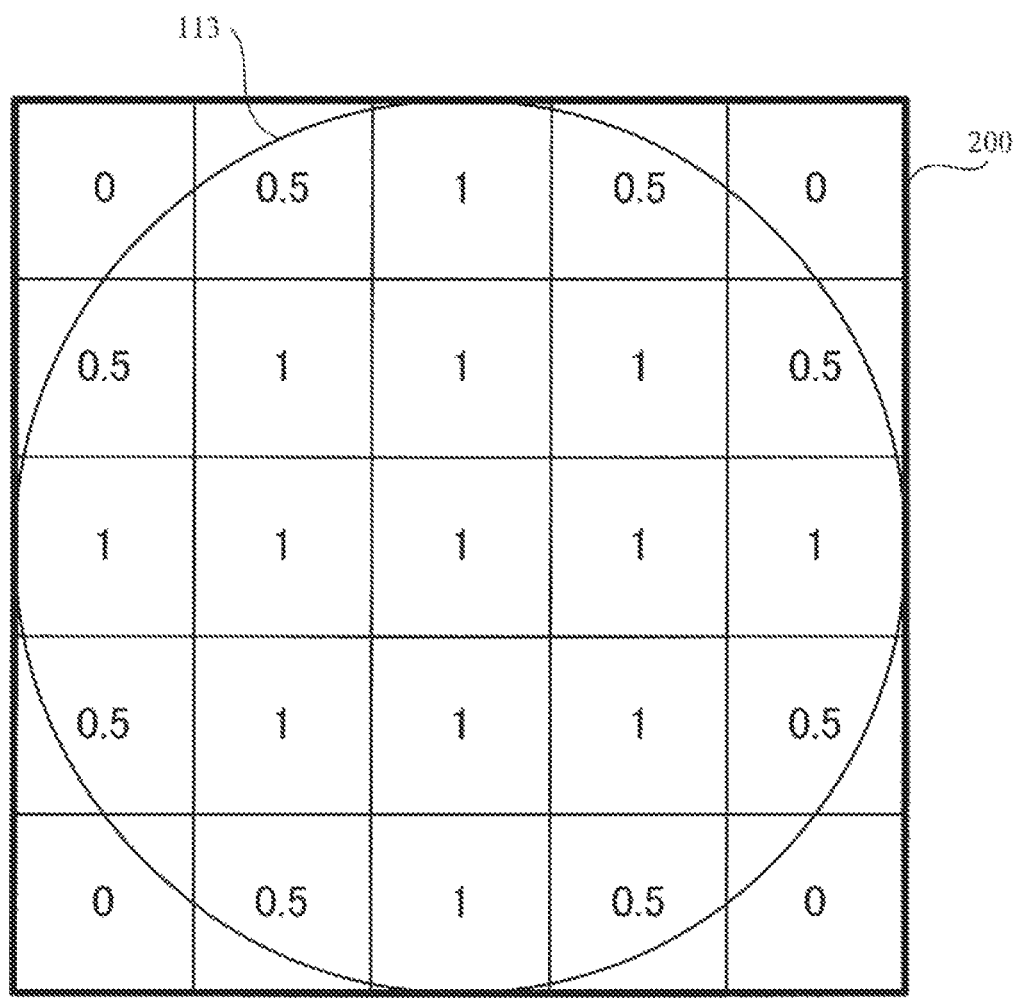
FIG. 11 is a diagram illustrating examples of weighting coefficients according to the positions in the pixel array.

In step S704, the correction value for correcting the defect pixel is generated using the image signal from the pixels for generating the correction value that have been selected in S703. In this embodiment, the arithmetic average of pixels used for correction value generation is the correction value. However, the present embodiment is not limited to this. According to the position in the pixel array 200 of the selected pixels for generating the correction value, the weighted average value using the weighting coefficient as illustrated in FIG. 11 may be the correction value. FIG. 11 is an example of weighting coefficients corresponding to the pixel array 200 illustrated in FIG. 4B. In FIG. 4B, if the weighting coefficients of pixels (e.g., p11, p15, p51 and p55) in the pixel array 200 corresponding to the region other than the effective pupil area of the photographing lens are set to be small, the noise affection can be reduced when the correction value is generated.

In step S705, correction is performed by replacing the output of the defect pixel with the correction value calculated in S704.

In step S706, it is determined whether all the pixels already underwent the processes in S702 to 705. If the processes are not still performed on all the pixels, the processing returns to S702 and it is determined whether the next pixel is a defect pixel or not. If the next pixel is the final pixel, the defect correction operation is finished.

Next, a method of selecting pixels used for creating the correction value in step S703 will be described in detail. Here, the description is made assuming that the pixel corresponding to the pupil division area (uk, pk) of the photographing lens among the pixels included in the pixel array 200 corresponding to the microlens on the coordinates ($x_k'$, $y_k'$) on the microlens array is a defect pixel.

A position on the synthetic image plane through which the ray of light emitted from the pupil division area ($u_k$, $p_k$) of the photographing lens plane and entering the microlens on the coordinates ($x_k'$, $y_k'$) on the microlens array plane to be focused on the defect pixel passes is the position ($x_k$, $y_k$). First, the coordinates ($x_k$, $y_k$) are calculated.

Figure 8:
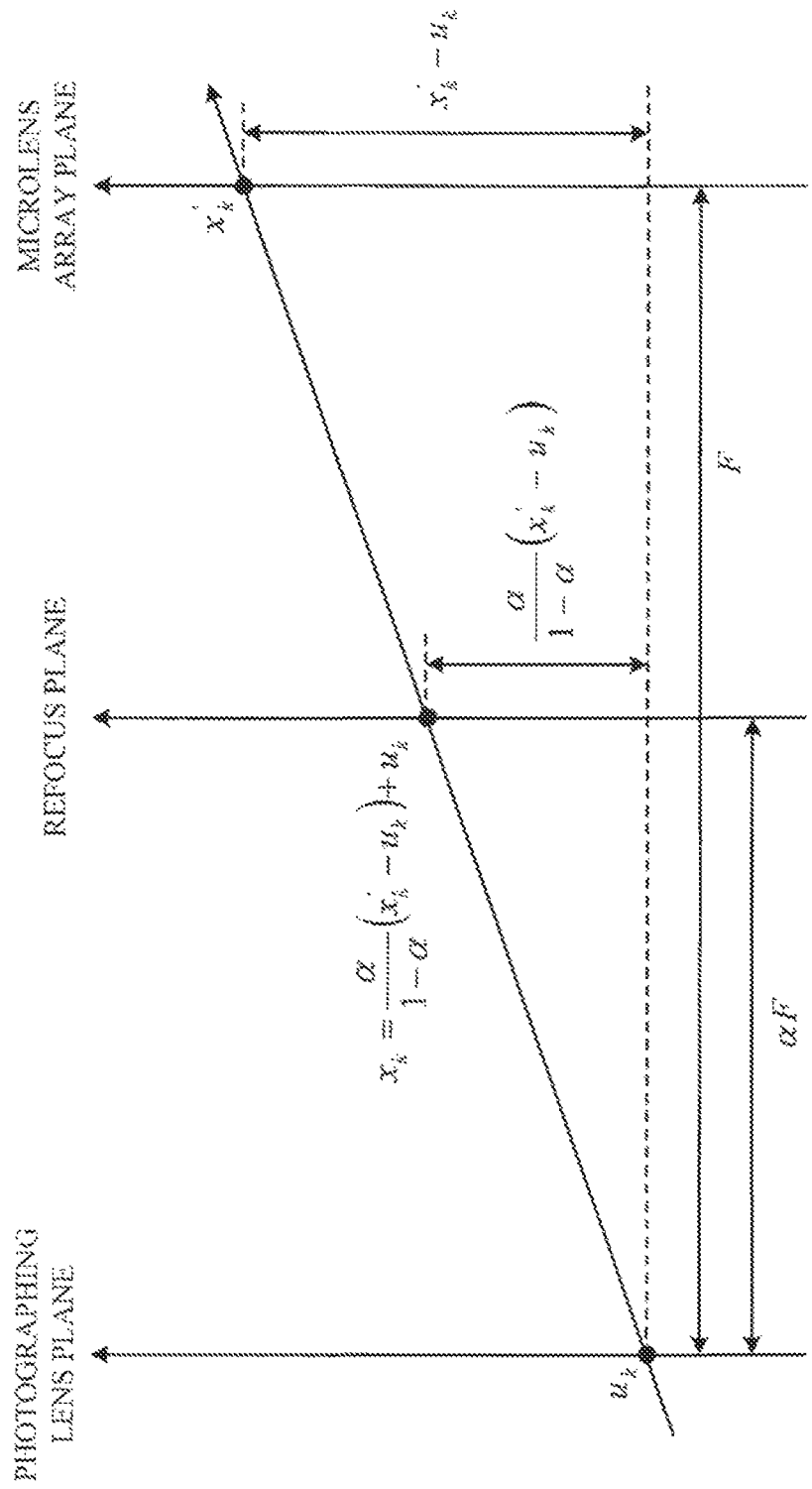
FIG. 8 is a diagram illustrating a relationship between a ray of light which exits from the pupil division area of the photographing lens and then arrives at the microlens, and a passing position on the refocus plane.

FIG. 8 is a conceptual diagram for illustrating through which coordinates on the refocus plane the ray of light emitted from the pupil division area ($u_k$, $p_k$) of the photographing lens plane and arriving at the microlens on the coordinates $(x_k', y_k')$ on the microlens array plane passes. As with FIG. 5, this diagram only illustrates the directions u, x and x' but omits the vertical directions v, y and y'.

As can be known from FIG. 8, the coordinates $(x_k, y_k)$ on the refocus plane through which the ray of light passes can be represented by an equation (3).

$$(x_k, y_k) = \left(\frac{\alpha}{1-\alpha}(x_k' - u_k) + u_k, \frac{\alpha}{1-\alpha}(y_k' - v_k) + v_k\right) \quad (3)$$

Accordingly, the pixels receiving rays of light passing through the identical position $(x_k, y_k)$ on the refocus plane represented by the equation (3) are to be integrated together with the defect pixel when an image is reconstructed. Provided that these pixel outputs are represented by L (x', y', u, v), L (x', y', u, v) can be represented by an equation (4) using the equation (1).

$$L(x', y', u, v) = L\left(u + \frac{x_k - u}{\alpha}, v + \frac{y_k - v}{\alpha}, u, v\right) \quad (4)$$

Here, the representative coordinates (u, v) are on the pupil division areas other than the pupil division area $(u_k, v_k)$ through which the ray enters the defect pixel. That is, the integration of the equation (2) can be calculated by a simple addition.

For instance, the correction value is created from the average value of four pixels positioned near, i.e., upper, lower, right and left to the defect pixel on the image pickup element among the pixels used for reconstructing the image together with the defect pixel. In this case, the correction value is calculated from the four pixel outputs obtained by substituting $(u_k+d, v_k)$, $(u_k-d, v_k)$, $(u_k, v_k+d)$, $(u_k, v_k-d)$ respectively into (u, v) of the equation (4).

A notation d denotes distance between the representative coordinates of adjacent pupil division areas of the photographing lens. Here, assuming that the distance F is from the photographing lens 101 to the microlens array 102, the distance f is from the microlens array to the image pickup element 103, the pixel pitch of the image pickup element is s, and the F-numbers of the photographing lens and the microlens are equal, the d may be expressed as the equation (5).

$$d = \frac{F}{f}s \quad (5)$$

In the case where the refocus plane is set on the microlens array plane, i.e. the case of $\alpha=1$, the equation (3) appears to be not worked out. In this case, an image of the photographing lens is formed by the microlens on the corresponding pixel array. The pixel adjacent to the defect pixel on the pixel array can be selected as pixels for correction in accordance with the method of calculating the correction value.

FIGS. 9A, 9B, 10A and 10B illustrate examples of the pixels for creating the correction value selected according to the above-described method.

Figure 9A:
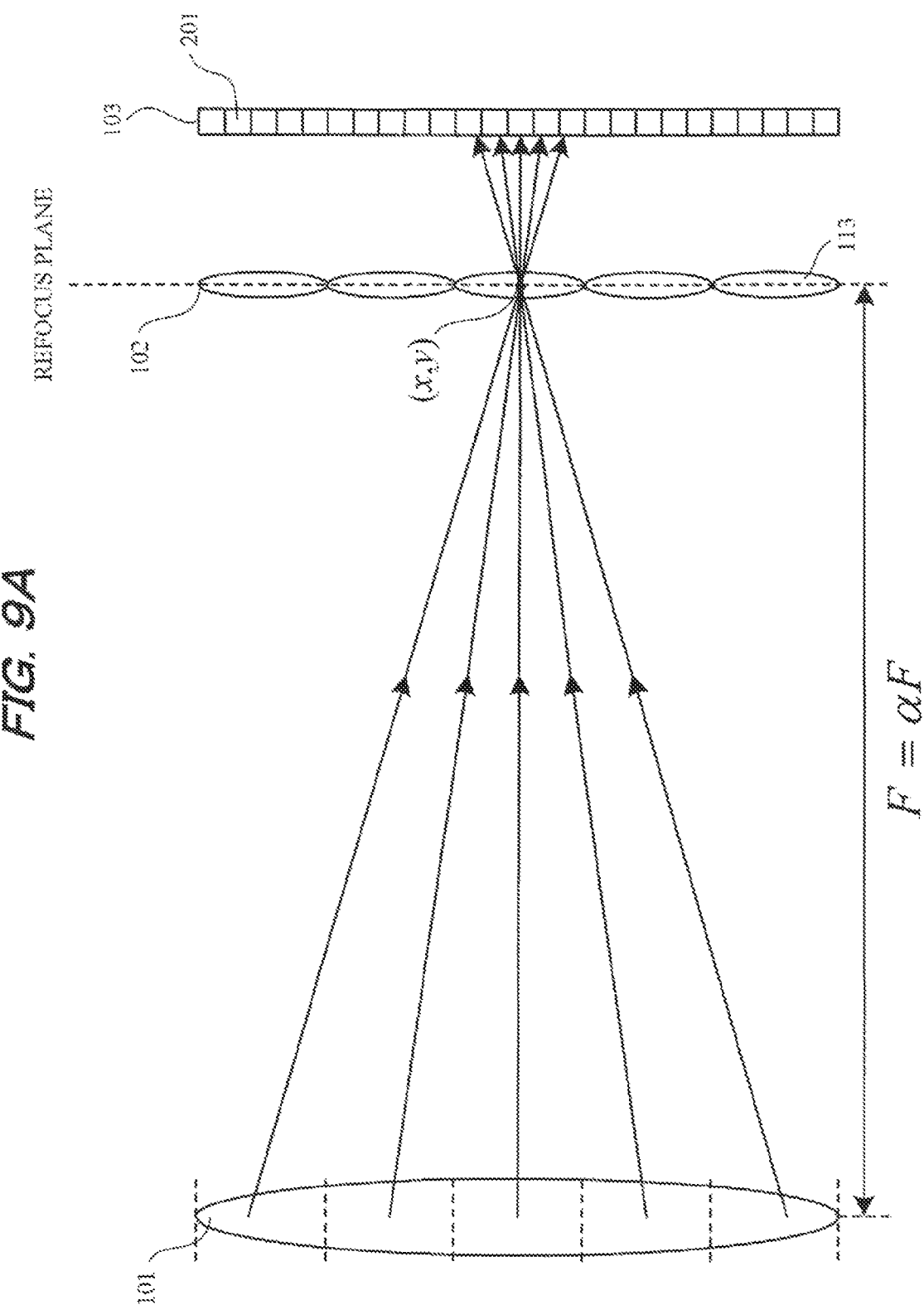
FIGS. 9A and 9B are conceptual diagrams of rays of light emitted from the respective pupil division areas of the photographing lens, passing through the microlens array, and arriving at the respective pixels of the image pickup element.
Figure 9B:
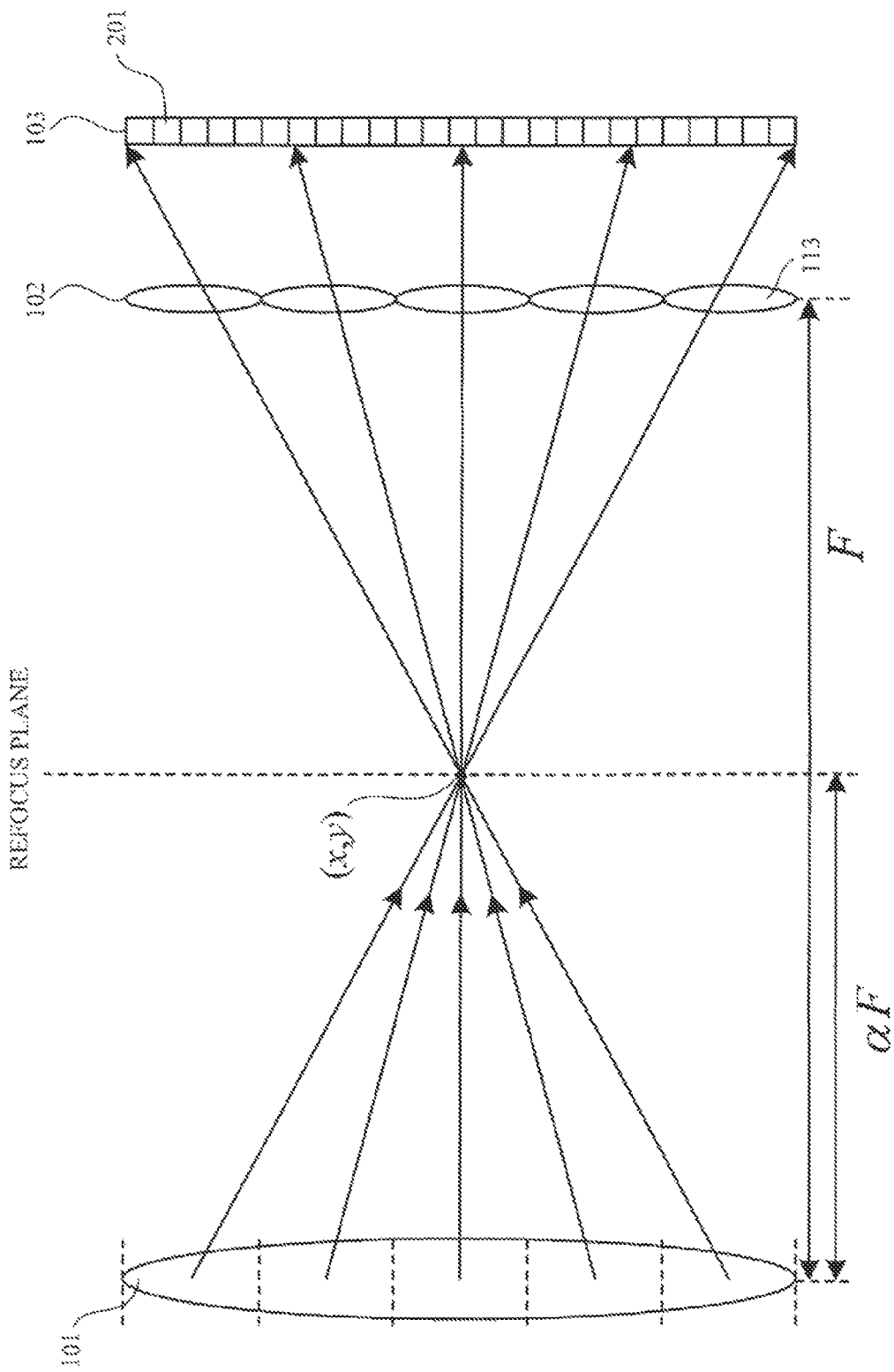
Figure 10A:
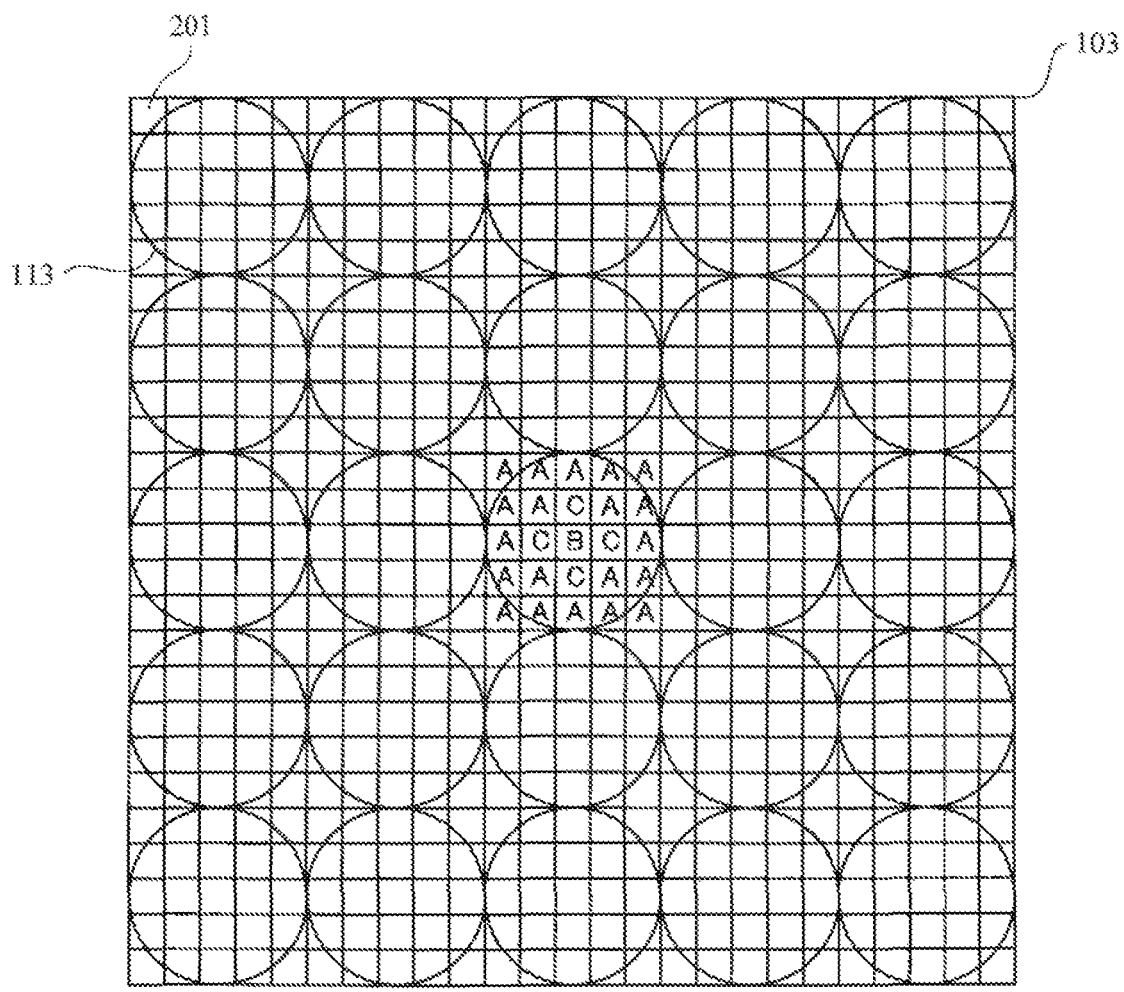

FIGS. 9A and 9B are conceptual diagrams illustrating a situation where the rays of light emitted from the respective pupil division areas of the photographing lens 101 pass through the microlens array 102 and arrive at the respective pixels of the image pickup element 103. FIGS. 10A and 10B are conceptual diagrams illustrating the image pickup element 103 and the microlens array 102 when viewing the element and the array from the direction of the optical axis.

FIG. 9A illustrates the ray of light when the refocus plane is set at the position identical to that of the microlens array ($\alpha=1$). In this case, the pixels used for generating the pixel signal of a reconstructed image of de coordinates (x, y) on the refocus plane are pixels indicated as pixels A, B and C in FIG. 10A. When the refocus plane is set on the microlens array, all the pixels to be used for reconstructing certain coordinates are pixels in the same pixel array. When the pixel B is a defect pixel in FIGS. 10A and 10B, the pixels for creating the correction value of the defect pixel B are four pixels C adjacent to the defect pixel B. Then, correction is performed, by replacing the output of the defect pixel B with the average of the four pixels C.

Meanwhile, the ray of light of a case where the refocus plane is set on the side of photographing lens with respect to the microlens array ($0<\alpha<1$) is as illustrated in FIG. 9B. In this case, pixels used for generating a pixel signal of a reconstructed image of the coordinates (x, y) on the refocus plane are pixels on distant positions as indicated, as pixels A, B and C in FIG. 10B, for instance. Here, when the pixel B is a defect pixel, pixels to be used for creating the correction value of the defect pixel B are four pixels C near the defect pixel B among pixels used for reconstructing an image. Then, correction is performed by replacing the output of the defect pixel B with the average value of the four pixels C.

As shown in FIGS. 9A, 9B, 10A and 10B, even in the case of correction of the defect pixel on the identical position, the pixels to be used to correct the defect pixel are different according to the position on the set synthetic image plane. The present invention enables appropriate correction to be performed on the defect pixel according to such a situation.

A configuration may be adopted where the defect correction process is performed in the reconstruction unit 602. That is, the reconstruction process represented by the equation (2) is sequentially performed in the reconstruction unit 602. If a defect is in pixels used for reconstructing an image, the correction value may be created from the pixel value represented by the equation (4).

As described above, first, this embodiment obtains which coordinates on the refocus plane the defect pixel is used for reconstruction of. The coordinates of other pixels used for reconstructing she image on she coordinates of she obtained refocus plane are calculated. The correction value is created from the output values of the pixels of the calculated coordinates. Thus, the defect pixel can be appropriately corrected with respect to a taken image for reconstructing a refocused image.

The control by the system control unit 108 may be performed by one piece of hardware or may be shared among multiple pieces of hardware to control the entire apparatus. In the above embodiment, the present invention has been described exemplifying the image pickup apparatus. However, it is apparent that the present invention is applicable to processes on an image signal provided from a recording medium in a processing apparatus, such as PC.

Other Examples

Aspects of the present invention can also be realized by a computer or a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s) For this purpose, the program is provided to the computes for example via a network or from a recording medium of various types serving as the memory device (e.g., computes-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus for processing an image signal obtained from an image pickup element using an image pickup optical system arranged to obtain directional traveling information of object image light corresponding to a pupil division area of a photographing lens, comprising:
 a synthetic image plane position setting unit configured to set a position of a synthetic image plane on which an image of the object is reconstructed using the image signal obtained from the image pickup element; and
 a correction unit configured to correct an image signal of a defect pixel of the image pickup element using an image signal of another pixel of the image pickup element,
 wherein the correction unit determines the another pixel to be used for correcting the image signal of the defect pixel on the basis of a position of the synthetic image plane set by the synthetic image plane position setting unit, and directional traveling information of the object image light.

2. The image processing apparatus according to claim 1, wherein the correction unit selects the another pixel from among pixels receiving object image light including information on a traveling direction at a position identical to a position on the synthetic image plane, at which the object image light arriving at the defect pixel passes through, and generates a correction value of the image signal of the defect pixel using a pixel signal of the selected pixel.

3. The image processing apparatus according to claim 2, wherein the selected pixel is a pixel at which the object image light coming from a pupil division area adjacent to a pupil division area from which the object light arriving at the defect pixel arrives among object image light including information on a traveling direction at a position identical to a position on the synthetic image plane, at which the object image light arriving at the defect pixel passes through.

4. The image processing apparatus according to claim 1, wherein the correction unit generates a correction value of the image signal of the defect pixel by an arithmetic average of the image signals of the other pixels.

5. The image processing apparatus according to claim 1, wherein the correction unit generates a correction value of the image signal of the defect pixel by a weighted average using a weighting of the image signal of pixels correspondingly to a position of the pupil division area.

6. A control method of an image processing apparatus for processing an image signal obtained from an image pickup element using an image pickup optical system arranged to obtain directional traveling information of object image light corresponding to a pupil division area of a photographing lens, comprising:
 setting a position of a synthetic image plane on which an image of the object is reconstructed using the image signal obtained from the image pickup element; and
 correcting an image signal of a defect pixel of the image pickup element using an image signal of another pixel of the image pickup element,
 wherein the correcting includes determining the another pixel to be used for correcting the image signal of the defect pixel on the basis of a position of the synthetic image plane set by the synthetic image plane position setting, and directional traveling information of the object image light.

7. A non-transitory computer readable storage medium storing a program comprising a program code for causing a computer to execute a control method of the image processing apparatus according to claim 6.

8. An image pickup apparatus, comprising:
 an image pickup optical system arranged to obtain directional traveling information of object image light corresponding to a pupil division area of a photographing lens;
 an image pickup element that photoelectrically converts object image light focused by the image pickup optical system to output an image signal; and
 the image processing apparatus according to claim 1.

9. The image pickup apparatus according to claim 8, wherein the image pickup optical system comprises a microlens array corresponding to the pupil division area between the photographing lens and the image pickup element, and respective pixels included in a pixel array of the image pickup element corresponding to each microlens correspond to the respective pupil division areas in the photographing lens.

* * * * *